(12) United States Patent
Rudolf

(10) Patent No.: US 7,248,621 B2
(45) Date of Patent: Jul. 24, 2007

(54) METHOD FOR ALLOCATING SECONDARY SYNCHRONIZATION CODES TO A BASE STATION OF A MOBILE TELECOMMUNICATION SYSTEM

(75) Inventor: Marian Rudolf, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 466 days.

(21) Appl. No.: 10/742,951

(22) Filed: Dec. 23, 2003

(65) Prior Publication Data

US 2004/0142712 A1    Jul. 22, 2004

Related U.S. Application Data

(62) Division of application No. 10/030,421, filed as application No. PCT/JP01/03841 on May 8, 2001, now Pat. No. 6,728,297.

(30) Foreign Application Priority Data

May 10, 2000   (EP)  ................... 00401283

(51) Int. Cl.
     *H04B 1/69* (2006.01)
(52) U.S. Cl. ..................................... 375/145
(58) Field of Classification Search ............... 375/343, 375/356, 358, 354, 220, 145, 146, 149, 130, 375/135; 370/320, 335, 342
     See application file for complete search history.

(56) References Cited

U.S. PATENT DOCUMENTS

| | | | |
|---|---|---|---|
| 5,930,366 A | 7/1999 | Jamai et al. | |
| 6,078,607 A | 6/2000 | Monroe et al. | |
| 6,185,244 B1 | 2/2001 | Nystrom et al. | |
| 6,363,060 B1 | 3/2002 | Sarkar | |
| 6,385,264 B1 | 5/2002 | Terasawa et al. | |
| 6,438,376 B1 | 8/2002 | Elliott et al. | |
| 6,504,830 B1 | 1/2003 | Ostberg et al. | |

(Continued)

FOREIGN PATENT DOCUMENTS

EP    WO 99/66754    12/1999

(Continued)

OTHER PUBLICATIONS

3G TS 25.223 V3.1.0 (Dec. 1999),; 3$^{rd}$ Generation Partnership Project (3GPP); Technical Specification Group (TSG) Radio Access Network (RAN); pp. 10-11 (Release 1999).

(Continued)

*Primary Examiner*—Emmanuel Bayard
(74) *Attorney, Agent, or Firm*—Oblon, Spivak, McClelland, Maier & Neustadt, P.C.

(57)    ABSTRACT

According to the invention, the method comprises the steps of calculating and evaluating the auto-correlation functions and/or cross-correlation functions of N possible secondary synchronization codes (SSC) and the primary synchronization code (PSC) and choosing the M secondary synchronization codes (SSC) amongst said N possible secondary synchronization codes (SSC) so that said the M chosen secondary synchronization codes (SSC) have at least one of the statistical properties of their auto-correlation function and cross-correlation function that is best in term of detection, and allocating a sub-set of said M secondary synchronization codes (SSC) comprising K secondary synchronization codes (SSC) to said base station.

23 Claims, 4 Drawing Sheets

| | MAS of Auto-correlation (off-peak) | RMS of Auto-correlation (off-peak) | MCP of Cross-correlation with PSC | RMS of Cross-correlation with PSC |
|---|---|---|---|---|
| $SSC_0$ | 64 | 12.11 | 81 | 10.49 |
| $SSC_1$ | 64 | 12.72 | 67 | 11.28 |
| $SSC_2$ | 80 | 13.94 | 111 | 12.13 |
| $SSC_3$ | 80 | 14.37 | 75 | 12.58 |
| $SSC_4$ | 112 | 15.86 | 89 | 11.90 |
| $SSC_5$ | 112 | 16.96 | 67 | 9.93 |
| $SSC_6$ | 96 | 13.26 | 79 | 11.65 |
| $SSC_7$ | 96 | 13.37 | 99 | 12.91 |
| $SSC_8$ | 96 | 13.45 | 83 | 12.10 |
| $SSC_9$ | 96 | 14.83 | 109 | 12.31 |
| $SSC_{10}$ | 112 | 15.70 | 77 | 11.24 |
| $SSC_{11}$ | 112 | 15.70 | 99 | 10.46 |
| $SSC_{12}$ | 80 | 13.20 | 79 | 11.62 |
| $SSC_{13}$ | 80 | 13.43 | 79 | 11.48 |
| $SSC_{14}$ | 64 | 10.98 | 77 | 11.87 |
| $SSC_{15}$ | 64 | 11.90 | 83 | 11.48 |

U.S. PATENT DOCUMENTS 6,526,091 B1 * 2/2003 Nystrom et al. ............ 375/142
6,567,482 B1   5/2003 Popovic
7,103,085 B1 * 9/2006 Dabak et al. ............... 375/132

FOREIGN PATENT DOCUMENTS

| WO | 99 12273 | 3/1999 |
| WO | 99 12295 | 3/1999 |
| WO | 99 66754 | 12/1999 |
| WO | 00 10282 | 2/2000 |

OTHER PUBLICATIONS

3G TS 25.213 V3.3.0 DRAFT (Jun. 2000),; 3rd Generation Partnership (3GPP); Technical Specification Group (TSG) Radio Access Network (RAN); pp. 22-24 (Release 1999).

* cited by examiner

|  | MAS of Auto-correlation (off-peak) | RMS of Auto-correlation (off-peak) |
|---|---|---|
| PSC | 64 | 10.80 |

*FIG. 4A*

|  | MAS of Auto-correlation (off-peak) | RMS of Auto-correlation (off-peak) | MCP of Cross-correlation with PSC | RMS of Cross-correlation with PSC |
|---|---|---|---|---|
| $SSC_0$ | 64 | 12.11 | 81 | 10.49 |
| $SSC_1$ | 64 | 12.72 | 67 | 11.28 |
| $SSC_2$ | 80 | 13.94 | 111 | 12.13 |
| $SSC_3$ | 80 | 14.37 | 75 | 12.58 |
| $SSC_4$ | 112 | 15.86 | 89 | 11.90 |
| $SSC_5$ | 112 | 16.96 | 67 | 9.93 |
| $SSC_6$ | 96 | 13.26 | 79 | 11.65 |
| $SSC_7$ | 96 | 13.37 | 99 | 12.91 |
| $SSC_8$ | 96 | 13.45 | 83 | 12.10 |
| $SSC_9$ | 96 | 14.83 | 109 | 12.31 |
| $SSC_{10}$ | 112 | 15.70 | 77 | 11.24 |
| $SSC_{11}$ | 112 | 15.70 | 99 | 10.46 |
| $SSC_{12}$ | 80 | 13.20 | 79 | 11.62 |
| $SSC_{13}$ | 80 | 13.43 | 79 | 11.48 |
| $SSC_{14}$ | 64 | 10.98 | 77 | 11.87 |
| $SSC_{15}$ | 64 | 11.90 | 83 | 11.48 |

*FIG. 4B*

|  | MCP of all Cross-correlation's | RMS of all Cross-correlation's |
| --- | --- | --- |
| $SSC_0$ | 144 | 13.29 |
| $SSC_1$ | 128 | 13.37 |
| $SSC_2$ | 112 | 13.05 |
| $SSC_3$ | 144 | 13.38 |
| $SSC_4$ | 128 | 12.90 |
| $SSC_5$ | 144 | 13.18 |
| $SSC_6$ | 144 | 13.22 |
| $SSC_7$ | 144 | 13.33 |
| $SSC_8$ | 144 | 13.08 |
| $SSC_9$ | 144 | 13.35 |
| $SSC_{10}$ | 144 | 13.04 |
| $SSC_{11}$ | 128 | 13.16 |
| $SSC_{12}$ | 144 | 13.22 |
| $SSC_{13}$ | 144 | 13.33 |
| $SSC_{14}$ | 144 | 13.23 |
| $SSC_{15}$ | 144 | 13.54 |

*FIG. 4C*

METHOD FOR ALLOCATING SECONDARY SYNCHRONIZATION CODES TO A BASE STATION OF A MOBILE TELECOMMUNICATION SYSTEM

CROSS-REFERENCE TO RELATED APPLICATIONS

This application is a divisional of U.S. patent application Ser. No. 10/030,421, filed May 22, 2002, now U.S. Pat. No. 6,728,297 the entire contents of which are hereby incorporated herein by reference.

TECHNICAL FIELD

The present invention relates to a method for allocating secondary synchronization codes to a base station of a mobile telecommunication system.

BACKGROUND ART

The present invention relates to a mobile telecommunication system comprising a number of base stations which can communicate with mobile stations. A communication from a mobile station to a base station is done by means of an up-link UL and the communication from a base station to a mobile station is done by means of a down-link DL.

The present invention relates also to a telecommunication systems wherein different user signals are separated both in time domain and in code domain. An example of such a system is the so called UMTS TDD system (Universal Mobile Telecommunication Systems—Time Division Duplex) or W-CDMA TDD system (Wideband Code Division Multiple Access—Time Division Duplex) in which the time domain is represented by the TDD-system component and the code domain by W-CDMA-system component.

More particularly, in time-domain, transmission is for example organized based on radio frames constituted of a number (for example 15) of timeslots. The same frequency is used for both the up-link (Mobile Station to Base Station) and the down-link (Base Station to Mobile Station). Furthermore, a time-separation is used to differentiate the down-link and the up-link such that a subset of all the available timeslots per frame is exclusively allocated for down-link transmission and the remaining ones for up-link transmission. In a frame, at least one timeslot is always allocated for each down-link and up-link.

In such a system, different user's signals can be transmitted in separate timeslots, e.g. N different down-link timeslots are allocated to N different down-link user signals. This is the time-division aspect of the system. Furthermore, several users signals can also be transmitted within one timeslot by using different spreading codes. This is the code-division aspect of the system. Note that each user is allocated a different spreading code and that each user bit is spread to the chip-rate as function of the employed spreading factor.

In such a system, the network allocates to each cell covered by the base stations different cell parameters which enable any mobile station attempting to establish connection to said base station to read cell broadcast information needed to communicate therewith. These cell parameters indicate for example a midamble number and a scrambling code. The midamble is a complex- or real-valued chip sequence and is used by a receiver (a mobile station in the downlink) for channel estimation which is needed for the retrieval of the user's signals. The scrambling code is used by the transmitter (a base station in the downlink) to scramble the user's signals in order to average the interference caused to user's who are sending or receiving in neighboring cells.

When a mobile station gets switched on, it must first find out chip, slot and frame timing of at least one cell covering the area in which it is and then find out which midamble and scrambling code are used before it can demodulate and read the cell broadcast information. Afterwards, a tracking mechanism ensures that especially chip timing is not lost, once the mobile station is "synchronized" to the cell.

Each base station, for each cell, transmits the cell broadcast information on a channel which is generally the so-called Primary Common Control Physical Channel (P-CCPCH). It can also be the Secondary Common Physical Channel (S-CCPCH) when it is pointed to by the Primary Common Control Physical Channel P-CCPCH.

Note that a Primary Common Control Physical Channel P-CCPCH in the W-CDMA TDD system generally uses a fixed and pre-allocated spreading code with fixed spreading factor, e.g. its spreading code is the same in all cells of the W-CDMA TDD system and therefore always known beforehand by the mobile station.

A physical synchronization channel (PSCH) is also transmitted simultaneously in those timeslots in the downlink where a Primary Common Physical Channel P-CCPCH is transmitted for the purpose of synchronization to the Primary Common Control Physical Channel (P-CCPCH). The Physical Synchronization Channel essentially consists of two special signals: the primary synchronization code PSC and a set of K secondary synchronization codes SSC. The number K of secondary synchronization codes SSC is generally 3. A Primary Common Physical Channel P-CCPCH is never allocated to a particular timeslot when there is no Primary Synchronization Channel PSCH simultaneously present. If the mobile station finds out in which timeslots the Primary Synchronization Channel PSCH is sent, it knows that the Primary Common Physical Channel P-CCPCH is also in this timeslot.

Each of the K in parallel transmitted secondary synchronization code SSC spreads a symbol having a number $n$ of states, i.e. a modulated Quadrature Phase Shift Keying (QPSK) symbol, which gives a total of $n^K$ QPSK codewords.

On one hand, the combination of the code sets, e g. different triplets to spread the QPSK-symbols and, on the other hand, the modulation of these QPSK-symbols are used for indicating:

A Code Group for which are defined univocally one or several cell parameters, e g. one or several scrambling codes together with one or several basic short or long midamble codes, The position of the Primary Synchronization Channel PSCH within a double-frame period, and The position of the current Primary Synchronization Channel PSCH timeslot within one frame.

Finally, at power-on, a mobile station first searches by performing a correlating process for the presence of the Primary Synchronization Code PSC transmitted on the Primary Synchronization Channel PSCH by the base station of the cell under the coverage of which it is and uses the found time positions for correlating with all possible secondary synchronization codes SSC, generally 16. By performing a coherent detection, e.g. using the Primary Synchronization Code PSC as a phase reference for the secondary synchronization codes SSC, it can also detect the QPSK-symbols spread by the K detected secondary synchronization codes SSC. From this information it can derive the time position of the Primary Synchronization Channel PSCH slot within the frames period as well as the Code Group to which the base station belongs. In a last step, the mobile station can demodulate a burst on the Primary Common Control Physical Channel P-CCPCH by trying all still possible of Scrambling Codes and Basic Midamble Codes which are contained in the found Cod Group.

Each secondary synchronization code SSC is a different binary-valued chip sequence which is referenced by a particular index. For example, when 16 secondary synchronization codes SSC are possible in the mobile communication system, each secondary synchronization code SSC is indicated by one of the following values:

$SSC_0$, $SSC_1$, $SSC_2$, . . . , $SSC_{15}$.

For example, each of the secondary synchronization code SSC is formed according to the rules defined in the Technical Specifications 3GPP TSG RAN TS25.213 v320 "Spreading and Modulation (FDD)", section 5.2.3.1 page 21ff. and 3GPP TSG RAN TS25.223 v320 "Spreading and Modulation (TDD)", section 7.1 page 10ff.

Not all of the possible and available secondary synchronization codes SSC are used simultaneously in a cell for the synchronization purposes above described Currently, for making the choice of each set of K secondary synchronization codes SSC allocated to a cell, the network takes out of the N possible ones, the first K secondary synchronization codes SSC, then the second K secondary synchronization codes SSC, etc. M out of N are chosen, the last N−M being unused. For the W-CDMA TDD, system, wherein K is 3 and N is 16, for simplicity reasons, the following 4 code groups (e.g. triplets of SSC) are chosen by the network and allocated to the specific cells:

Code group 1: $SSC_0$, $SSC_1$, $SSC_2$
Code group 2: $SSC_3$, $SSC_4$, $SSC_5$.
Code group 3: $SSC_6$, $SSC_7$, $SSC_8$.
Code group 4: $SSC_9$, $SSC_{10}$, $SSC_{11}$.

Thus, only M=K*L secondary synchronization codes SSC out of N possible and available ones are used for synchronization purposes The performance of the synchronization process above described is very sensible to the errors than can occur during transmission or during the correlation processes performed for the retrievals of the primary synchronization code PSC and of the secondary synchronization codes SSC.

DISCLOSURE OF INVENTION

It is an object of the invention to provide a method for allocating secondary synchronization codes SSC to a base station of a mobile telecommunication system in order to improve the performance of the synchronization process.

Generally speaking, in a system concerned with the invention, each base station continuously transmits a primary synchronization code PSC and a set of K secondary synchronization codes SSC respectively allocated to the cell covered by said base station so that any mobile station, when getting switched on, can, on basis of the primary synchronization code PSC and the set of secondary synchronization codes SSC received from said base stations synchronize with at least one base station in order to read cell parameters. Furthermore, only a predetermined and fixed number M of secondary synchronization codes SSC amongst all the N possible and available secondary synchronization codes SSC are used.

According to a feature of the invention, the method comprises the steps of calculating and evaluating the auto-correlation functions and/or cross-correlation functions of N possible secondary synchronization codes SSC and the primary synchronization code PSC and of selecting the M secondary synchronization codes SSC amongst said N possible secondary synchronization codes SSC so that said M chosen secondary synchronization codes SSC have at least one of the statistical properties of their auto-correlation function and cross-correlation function that is best in term of detection, and allocating a sub-set of said M secondary synchronization codes SSC comprising K secondary synchronization codes SSC to said base station.

Note that the auto- and cross-correlation functions can either be evaluated over the entire range, but also only over a limited window. That means that a subset of all possible auto- or cross-correlation values can be taken for evaluation.

It has been found that the statistical auto-correlation function properties of these synchronization codes are of primary importance for Cell Search performance as they directly impact the probability of false or erroneous detection.

Also, whenever a primary synchronization code PSC and one or more secondary synchronization codes SSC are sent in parallel, the auto-correlation function of the primary synchronization code PSC as well as the auto-correlation function of the secondary synchronization codes SSC suffer from undesired cross-correlation functions caused by the simultaneous presence of another synchronization code.

According another feature of the present invention, the selection step is based upon the evaluation of any statistical property or combination of it of the following correlation functions:

(1) auto-correlation function of each secondary synchronization code SSC (2) cross-correlation functions of each secondary synchronization code SSC with the primary synchronization code PSC, (3) cross-correlation functions of every secondary synchronization codes SSC with any other secondary synchronization code SSC.

These above criteria can be applied separately or combined

BRIEF DESCRIPTION OF THE DRAWINGS

FIG. 4 shows tables wherein are given statistical properties of the auto-correlation functions and the cross-correlation functions of state-of-the-art synchronization codes available in a W-CDMA TDD system.

BEST MODE FOR CARRYING OUT THE INVENTION

Figure 1A:
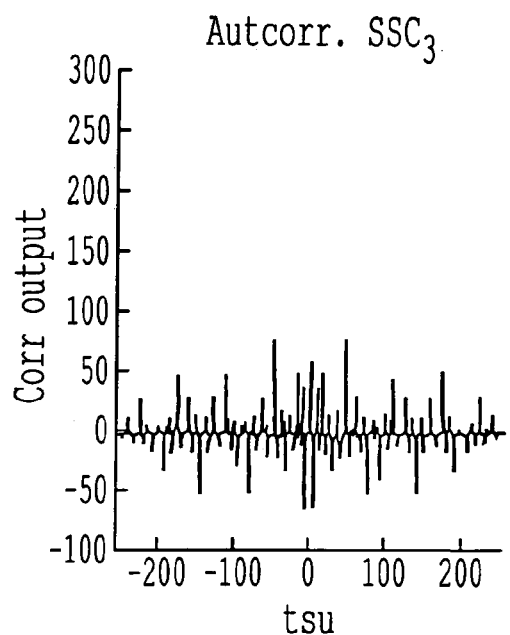
FIGS. 1 and 2 respectively show the auto-correlation functions of the secondary synchronization code $SSC_3$ and the secondary synchronization code $SSC_7$ and their respective cross-correlation functions with the primary synchronization code PSC.
Figure 1B:
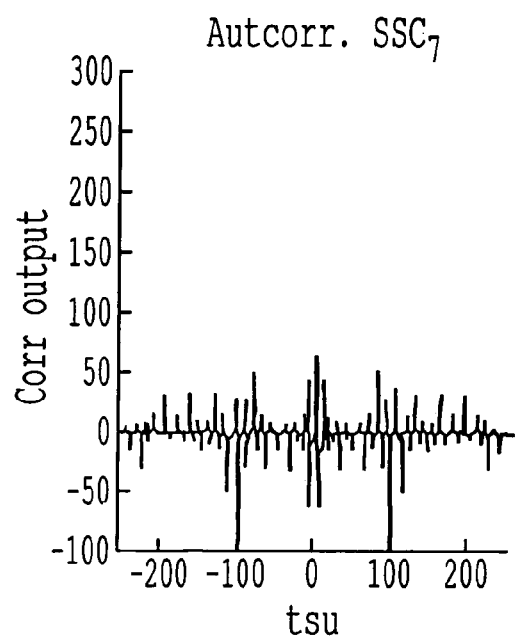
Figure 2A:
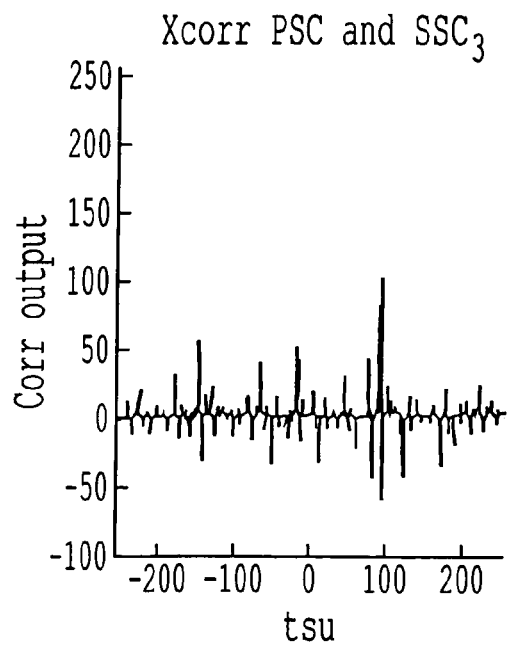
Figure 2B:
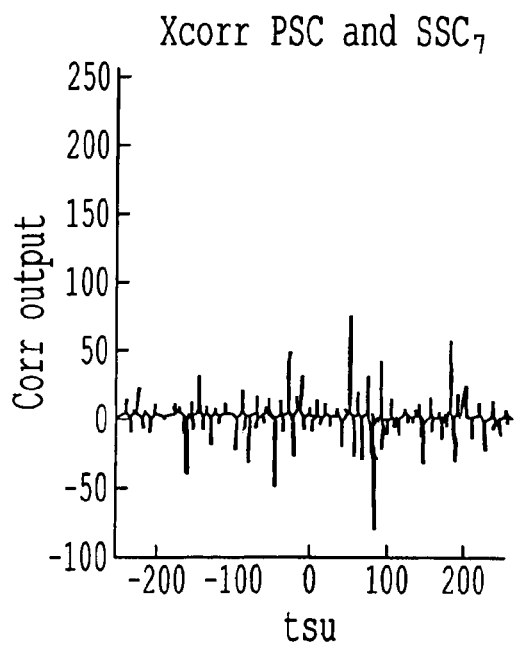

FIGS. 1 and 2 respectively show the auto-correlation functions of the secondary synchronization code $SSC_3$ and the secondary synchronization code $SSC_7$ and their respective cross-correlation functions with the primary synchronization code PSC The synchronization codes used for FIGS.

1 and 2 are current state-of-the-art synchronization codes available in a W-CDMA TDD system.

Figure 3A:
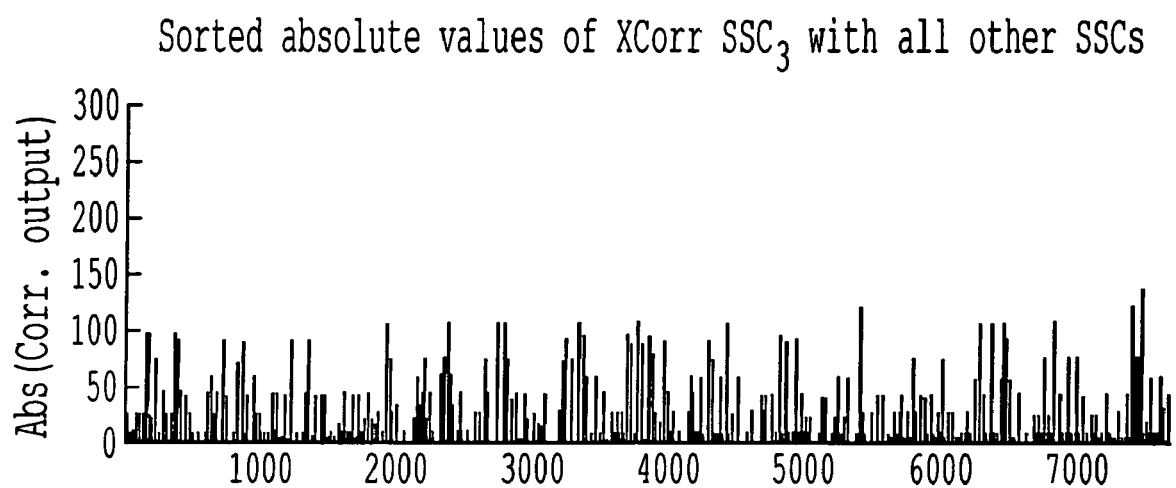
FIG. 3 shows the difference between the auto-correlation functions of the secondary synchronization code $SSC_3$ and the secondary synchronization code $SSC_7$ that can also be observed for the statistical properties of their pair-wise mutual cross-correlation functions with all other secondary synchronization codes SSC (displayed sequential order in FIG. 3)
Figure 3B:
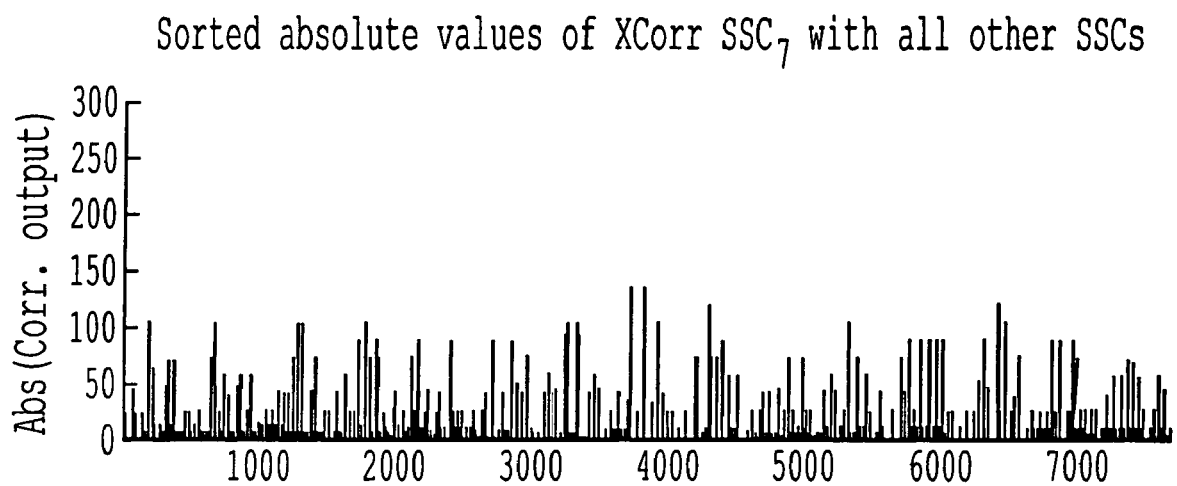

From these examples, it becomes clear that the auto-correlation functions of the secondary synchronization codes $SSC_3$ and $SSC_7$ are quite different, the auto-correlation function of the secondary synchronization code $SSC_3$ being better in term of detection Furthermore, the cross-correlation function of the primary synchronisation code PSC and the secondary synchronization code $SSC_3$ is worse in term of detection than the cross-correlation of the primary synchronization code PSC and the secondary synchronization code $SSC_7$ FIG. 3 shows the difference between the secondary synchronization codes $SSC_3$ and $SSC_7$ that can also be observed for the statistical properties of their pair-wise mutual cross-correlation functions with all other secondary synchronization codes SSC (displayed sequential order in FIG. 3).

According to one aspect of the invention, said statistical properties are one or several properties of the total energy contained by said auto-correlation functions and/or cross-correlation functions.

Statistically, the auto-correlation function can be characterized by its maximum auto-correlation side-lobe value (MAS-value). It can also be characterized by more than one values of its maximum side-lobes It can still be characterized by the root of the mean of the total energy contained in all side-lobe peaks (RMS) value.

Similar to the auto-correlation function, the cross-correlation function can be characterized by its maximum cross-correlation peak (MCP) value, by more than one values of its maximum peaks or by the root of the mean of the energy contained by all the cross-correlation peaks (RMS) value.

Generally speaking, the detection performance of a particular synchronization code will improve, when the maximum auto-correlation side-lobe value (MAS) and the root of the mean of the energy (RMS) value of its auto-correlation function and all maximum cross-correlation peak values (MCP) and the root of the mean of the energy peaks (RMS) values of its cross-correlation with all other possible synchronization codes decrease. Choosing synchronization codes with good auto-correlation and good cross-correlation properties improves the overall Cell Search performance and as such increases the performance of the synchronization procedure and reduces mobile station processing load and its battery life.

According another feature of the invention, the method comprises the step of choosing the best L groups composed of K secondary synchronization codes SSC, such that M=K*L, within all possible combinations out of N possible and available secondary synchronization codes SSC within the sub-set of the M used secondary synchronization codes SSC.

Note that in any case, a selection and therefore optimization of correlation properties for the sub-set of employed synchronization codes is always possible, as long as M<N.

According another feature of the invention, the selection step of the M secondary synchronization codes SSC comprises the steps of discarding the N−M secondary synchronization codes SSC that have at least one of the statistical properties of their auto-correlation function and cross-correlation function which are worst in term of detection and of keeping the M remaining secondary synchronization codes SSC.

Table 1, table 2 and table 3 of FIG. 4 summarize some of the statistical properties for the auto-correlation function and all cross-correlation functions of the current state-of-the-art synchronization codes which are available in the W-CDMA FDD and TDD system and that are described in the Technical Specifications 3GPP TSG RAN TS25.213 v320 "Spreading and Modulation (FDD)", section 5.2.3.1 page 21ff and 3GPP TSG RAN TS25.223 v320 "Spreading and Modulation (TDD)", section 7.1 page 10ff.

Referring to Table 1, the selection of the M=12 secondary synchronization codes SSC gives the following result when discarding the N−M=4 secondary synchronization codes SSC having the worst value of the off-peak maximum auto-correlation side-lobe values (MAS) in their auto-correlation function and keeping the remaining: $SSC_0$, $SSC_1$, $SSC_2$, $SSC_3$, $SSC_6$, $SSC_7$, $SSC_8$, $SSC_9$, $SSC_{12}$, $SSC_{13}$, $SSC_{14}$, $SSC_{15}$.

When discarding the N−M=4 secondary synchronization codes SSC having the worst value of the root of the mean of the energy peaks (RMS) value in their auto-correlation function and keeping the remaining, the result is: $SSC_0$, $SSC_1$, $SSC_2$, $SSC_3$, $SSC_6$, $SSC_7$, $SSC_8$, $SSC_9$, $SSC_{12}$, $SSC_{13}$, $SSC_{14}$, $SSC_{15}$.

When discarding the N−M=4 secondary synchronization codes SSC having the worst maximum cross-correlation peak value (MCP) in their cross-correlation function with the primary synchronization code PSC and keeping the remaining, the result is: $SSC_0$, $SSC_1$, $SSC_3$, $SSC_4$, $SSC_5$, $SSC_6$, $SSC_8$, $SSC_{10}$, $SSC_{12}$, $SSC_{13}$, $SSC_{14}$, $SSC_{15}$.

When discarding the N−M=4 secondary synchronization codes SSC having the worst value of the root of the mean of the energy peaks (RMS) in their cross-correlation function with the primary synchronization code PSC and keeping the remaining, the result is $SSC_0$, $SSC_1$, $SSC_4$, $SSC_5$, $SSC_6$, $SSC_8$, $SSC_{10}$, $SSC_{11}$, $SSC_{12}$, $SSC_{13}$, $SSC_{14}$, $SSC_{15}$ When discarding the N−M=4 secondary synchronization codes SSC having the worst maximum cross-correlation peak value (MCP) in their cross-correlation functions with the all other secondary synchronization codes SSC and keeping the remaining, the result is $SSC_0$, $SSC_1$, $SSC_2$, $SSC_4$, $SSC_8$, $SSC_9$, $SSC_{10}$, $SSC_{11}$, $SSC_{12}$, $SSC_{13}$, $SSC_{14}$, $SSC_{15}$.

When discarding the N−M=4 secondary synchronization codes SSC having the worst value of the root of the mean of the energy peaks (RMS) in their cross-correlation function with all other secondary synchronization codes SSC and keeping the remaining, the result is $SSC_0$, $SSC_2$, $SSC_4$, $SSC_5$, $SSC_6$, $SSC_7$, $SSC_8$, $SSC_{10}$, $SSC_{11}$, $SSC_{12}$, $SSC_{13}$, $SSC_{14}$.

According to another feature of the invention, the selection step of the M secondary synchronization codes SSC comprises the steps of selecting the best L code groups in term of detection, each group being composed of K distinct secondary synchronization codes SSC, such that M=K*L, out of all the N possible and available secondary synchronization codes SSC of the system.

For example, all the possible combinations of L code groups, composed each of K distinct secondary synchronization codes SSC, such than M=L*K<N, are considered and the statistical properties or the auto-correlation function of the secondary synchronization codes SSC of each code group, the statistical properties of the cross-correlation functions with all other secondary synchronization codes SSC in the same and other code groups and with the primary synchronization code PSC of each is determined. Then, these properties are evaluated and compared with those of the known code groups and the best combination of L (L=M:K) code groups are selected.

Suppose the number N of possible secondary synchronization codes SSC of the system is 16 and that they are those shown in Table 1.

The selection of L=4 sets of secondary synchronization codes SSC, composed each of K=3 distinct secondary synchronization codes SSC amongst the N=16 possible and available secondary synchronization codes SSC of the system according the embodiment of the selection step given below gives the following result: {$SSC_1$, $SSC_2$, $SSC_3$; $SSC_{12}$, $SSC_{13}$, $SSC_{14}$; $SSC_0$, $SSC_6$, $SSC_{15}$; $SSC_5$, $SSC_8$, $SSC_{11}$}.

According to another feature of the invention, the selection step of the M secondary synchronization codes SSC comprises the steps of selecting the best code groups in term of detection, each group being composed of K distinct secondary synchronization codes SSC out of M pre-selected, for example according to a preceding selection step of the method of the invention, secondary synchronization codes SSC.

As before, all the possible combinations of L code groups, composed each of K distinct secondary synchronization codes SSC, such that M=L*K<N, which can be formed from the M pre-selected secondary synchronization codes SSC are considered and the statistical properties of the auto-correlation function of the secondary synchronization codes SSC of each code groups, the statistical properties of the cross-correlation functions with all other secondary synchronization codes SSC in the same and other code groups and with the primary synchronization code PSC of each is determined. Then, these properties are evaluated and compared with those of the known code groups and the best combination of L (L=M:K) code groups are selected.

This process gives the following result when the pre-selected secondary synchronization codes SSC are given by discarding 4 secondary synchronization codes SSC having the worst value of the off-peak maximum auto-correlation side-lobe values (MAS) or the worst value of the root of the mean of the energy peaks (RMS) in the auto-correlation function {$SSC_2$, $SSC_9$, $SSC_{14}$; $SSC_6$, $SSC_{12}$, $SSC_{15}$; $SSC_0$, $SSC_1$, $SSC_8$; $SSC_3$, $SSC_7$, $SSC_{13}$}.

Another solution would be: {$SSC_7$, $SSC_{13}$, $SSC_{14}$; $SSC_6$, $SSC_{12}$, $SSC_{15}$; $SSC_0$, $SSC_1$, $SSC_8$; $SSC_2$, $SSC_3$, $SSC_9$}.

When the pre-selected secondary synchronization codes SSC are given by discarding 4 secondary synchronization codes SSC having the worst maximum cross-correlation peak value (MCP) or the worst root of the mean of the energy peaks (RMS) in their cross-correlation function with the primary synchronization code PSC: {$SSC_4$, $SSC_6$, $SSC_{10}$; $SSC_{12}$, $SSC_{13}$, $SSC_{14}$; $SSC_0$, $SSC_1$, $SSC_{15}$; $SSC_5$, $SSC_8$, $SSC_{11}$}.

INDUSTRIAL APPLICABILITY

As has been described, the method according to the invention for allocating secondary synchronization codes to a base station of a mobile telecommunication system is very useful to a system for allocating secondary synchronization codes to a base station of a mobile telecommunication system, which is mounted in various mobile terminals of every kind of a mobile telecommunication system.

The invention claimed is:

1. A method of communication between a base station and mobile stations in a UMTS telecommunication system, comprising:
transmitting to the mobile stations a primary synchronization code as well as a sub-set of secondary synchronization codes belonging to 12 predetermined secondary synchronization codes selected from 16 possible secondary synchronization codes (SSC0, . . . , SSC15); and
transmitting other information to the mobile stations.

2. The method of communication according to claim 1, wherein the 12 predetermined secondary synchronization codes are those having best values of an off-peak maximum auto-correlation side-lobe value (MAS) in their auto-correlation function among the 16 possible secondary synchronization codes (SSC0, . . . , SSC15).

3. The method of communication according to claim 1, wherein the 12 predetermined secondary synchronization codes are those having best values of a root of a mean of energy peaks (RMS) in an auto-correlation function among the 16 possible secondary synchronization codes (SSC0, . . . , SSC15).

4. The method of communication according to claim 1, wherein the 12 predetermined secondary synchronization codes are those having best maximum cross-correlation peak values (MCP) in a cross-correlation function with a primary synchronization code among the 16 possible secondary synchronization codes (SSC0, . . . , SSC15).

5. The method of communication according to claim 1, wherein the 12 predetermined secondary synchronization codes are those having best values of a root of a mean of energy peaks (RMS) in a cross-correlation function with a primary synchronization code among the 16 possible secondary synchronization codes (SSC0, . . . , SSC15).

6. The method of communication according to claim 1, wherein the 12 predetermined secondary synchronization codes having a best maximum cross-correlation peak values (MCP) in their cross-correlation function with a remainder of the 16 possible secondary synchronization codes (SSC0, . . . , SSC15).

7. The method of communication according to claim 1, wherein the 12 predetermined secondary synchronization codes having best values of a root of a mean of energy peaks (RMS) in a cross-correlation function with a remainder of the 16 possible secondary synchronization codes (SSC0, . . . , SSC15).

8. The method of communication according to any one of claims 1 to 7, characterized in that the base station transmits to the mobile stations a sub-set of 3 secondary synchronization codes among the 12 predetermined secondary synchronization codes selected.

9. A telecommunication system, comprising:
a base station; and
a plurality of mobile stations, wherein
the base station is configured to transmit to the plurality of mobile stations a primary synchronization code as well as a sub-set of secondary synchronization codes belonging to 12 predetermined secondary synchronization codes selected from 16 possible secondary synchronization codes (SSC0, . . . , SSC15).

10. A base station for a UMTS telecommunication system comprising a base station and mobile stations, comprising:
a transmitting configured to transmit to the mobile stations a primary synchronization code as well as a sub-set of secondary synchronization codes belonging to 12 predetermined secondary synchronization codes selected from 16 possible secondary synchronization codes (SSC0, . . . , SSC15).

11. A mobile station for a UMTS telecommunication system comprising a base station and mobile stations, comprising:
a receiver configured to receive a sub-set of secondary synchronization codes belonging to 12 predetermined secondary synchronization codes selected from 16 possible secondary synchronization codes (SSC0, . . . , SSC15).

12. A method for allocating secondary synchronization codes to a base station in a UMTS telecommunication system, comprising:
   allocating a sub-set of secondary synchronization codes belonging to 12 predetermined secondary synchronization codes selected from 16 possible secondary synchronization codes (SSC0, . . . , SSC15); and
   using the allocated sub-set of secondary synchronization codes in said base station to facilitate communications to a plurality of mobile stations.

13. The method for allocating secondary synchronization codes according to claim 12, wherein the 12 predetermined secondary synchronization codes having best values of an off-peak maximum auto-correlation side-lobe value (MAS) in an auto-correlation function among the 16 possible secondary synchronization codes (SSC0, . . . , SSC15).

14. The method for allocating secondary synchronization codes according to claim 12, wherein the 12 predetermined secondary synchronization codes having best values of a root of a mean of energy peaks (RMS) in an auto-correlation function among the 16 possible secondary synchronization codes (SSC0, . . . , SSC15).

15. The method for allocating secondary synchronization codes according to claim 12, wherein the 12 predetermined secondary synchronization codes having best maximum cross-correlation peak values (MCP) in a cross-correlation function with a primary synchronization code among the 16 possible secondary synchronization codes (SSC0, . . . , SSC15).

16. The method for allocating secondary synchronization codes according to claim 12, wherein the 12 predetermined secondary synchronization codes having best values of a root of a mean of energy peaks (RMS) value in a cross-correlation function with a primary synchronization code among the 16 possible secondary synchronization codes (SSC0, . . . , SSC15).

17. The method for allocating secondary synchronization codes according to claim 12, wherein the 12 predetermined secondary synchronization codes have a best maximum cross-correlation peak values (MCP) in their cross-correlation function with a remainder of the 16 possible secondary synchronization codes (SSC0, . . . , SSC15).

18. The method for allocating secondary synchronization codes according to claim 12, wherein the 12 predetermined secondary synchronization codes having best values of a root or a mean of energy peaks (RMS) in a cross-correlation function with a remainder of the 16 possible secondary synchronization codes (SSC0, . . . , SSC15).

19. The method for allocating secondary synchronization codes according to any one of claims 12 to 16, characterized in that the base station transmits to the mobile stations a sub-set of 3 secondary synchronization codes among the 12 predetermined secondary synchronization codes selected.

20. A telecommunication system, comprising:
   a base station; and
   mobile stations, wherein
   the mobile stations are configured to receive a sub-set of secondary synchronization codes belonging to 12 predetermined secondary synchronization codes selected from 16 possible secondary synchronization codes (SSC0, . . . , SSC15).

21. A method of communication between a base station and mobile stations in a UMTS telecommunication system, comprising:
   receiving by the mobile stations a sub-set of secondary synchronization codes belonging to 12 predetermined secondary synchronization codes selected from 16 possible secondary synchronization codes (SSC0, . . . , SSC15).

22. A method of communication between mobile stations and base stations in a telecommunication system, comprising:
   receiving secondary synchronization codes (SSCs) from only one of five sets of twelve synchronization codes comprising, {SSC0 SSC1, SSC2, SSC3, SSC6, SSC7, SSC8, SSC9, SSC12, SSC13, SSC14, SSC15}, {SSC0, SSC1, SSC3, SSC4, SSC5, SSC6, SSC8, SSC10, SSC12, SSC13, SSCT4, SSC15}, {SSC0, SSC1, SSC4, SSC5, SSC6, SSC5, SSC10, SSC11, SSC12, SSC13, SSC14, SSC15}, {SSC0, SSC1, SSC2, SSC4, SSC8, SSC9, SSC10, SSC11, SSC12, SSC13, SSC14, SSC15}, and {SSC0, SSC2, SSC4, SSC5, SSC6, SSC7, SSC8, SSC10, SSC11, SSC12, SSC13, SSC14}.

23. A method of communication between a base station and mobile stations in a UMTS telecommunication system, comprising:
   transmitting to the mobile stations a primary synchronization code as well as a sub-set of secondary synchronization codes belonging to 12 predetermined secondary synchronization codes selected from 16 possible secondary synchronization codes (SSC0, . . . , SSC15);
   transmitting other information to the mobile stations; and
   receiving the transmitted primary synchronization code and the sub-set of secondary synchronization codes for synchronization between the base station and the mobile stations.

* * * * *